United States Patent [19]

Farrell

[11] 4,047,873

[45] Sept. 13, 1977

[54] APPARATUS FOR MAKING MULTILAYERED BLOW MOLDED ARTICLES

[75] Inventor: John Jerome Farrell, Greenbrook, N.J.

[73] Assignee: Consupak, Inc., Morristown, N.J.

[21] Appl. No.: 640,490

[22] Filed: Dec. 15, 1975

[51] Int. Cl.² .............................................. B29D 23/03
[52] U.S. Cl. ................................... 425/523; 425/529; 425/533
[58] Field of Search ........... 425/DIG. 234, DIG. 209, 425/242 B, DIG. 215, DIG. 216, 388; 264/90, 97

[56] References Cited

U.S. PATENT DOCUMENTS

| | | | |
|---|---|---|---|
| 3,002,225 | 10/1961 | Goller | 425/DIG. 209 |
| 3,621,523 | 11/1971 | Dicks et al. | 425/DIG. 209 |
| 3,709,644 | 1/1973 | Farrell | 425/160 |
| 3,737,259 | 6/1973 | Valyi | 425/DIG. 234 |
| 3,836,305 | 9/1974 | Grazine | 425/156 X |
| 3,878,282 | 4/1975 | Bonis et al. | 425/DIG. 234 |
| 3,940,231 | 2/1976 | Uhlig | 425/DIG. 208 |
| 3,943,219 | 3/1976 | Aoki | 425/DIG. 234 |
| 3,947,176 | 3/1976 | Rainville | 425/DIG. 234 |

FOREIGN PATENT DOCUMENTS

| | | | |
|---|---|---|---|
| 1,023,639 | 3/1966 | United Kingdom | 425/DIG. 234 |

*Primary Examiner*—Richard B. Lazarus
*Attorney, Agent, or Firm*—Marvin Feldman; Stephen E. Feldman

[57] ABSTRACT

A multilayered hollow article is formed by first injection molding the outer layer parison on a core rod and then forming a clearance between this first parison and the core rod in a second mold, followed by injection molding the inner layer parison through the inside of the core rod to the outside of the core rod and into intimate contact with the outer layer, and subsequently blow molding the formed two-layered parison in a blow mold to obtain the final configuration. This method and apparatus are particularly suitable to forming multilayered containers wherein the innermost layer is a barrier thermoplastic, such as polyvinylidene chloride, and wherein the dimensional integrity of the innermost layer must be maintained.

20 Claims, 7 Drawing Figures

APPARATUS FOR MAKING MULTILAYERED BLOW MOLDED ARTICLES

This invention relates to a method and apparatus for blow molding multilayered articles, such as containers, from thermoplastic materials.

It is known in the prior art to employ specially formulated polymers such as barrier resins for use in food containers, particularly carbonated beverage containers. However, the use of such barrier resin containers has been limited because of the relatively high cost of such polymers.

One solution as illustrated in U.S. Pat. No. 3,878,282, is to provide a thin inner layer of expensive barrier material, backed by a thicker outer layer of relatively inexpensive polymeric material, such as polystyrene or polyethylene. In U.S. Pat. No. 3,878,282 the inner layer of barrier material was first injection molded on a core rod and requisitely cooled before applying the second outer layer of thermoplastic material on the top thereof, and thereafter blow molding the two-layered parison.

This approach required that the thin first layer of barrier thermoplastic be first cooled and then subjected to the high stresses of the second thicker layer being injection molded on the top thereof. The inner and thinner layer tended to be wiped from the mandrel or core rod, so that the dimensional integrity of the critical inner layer was difficult to maintain. This was particularly so wherein the inner barrier material was polyvinylidene chloride (PVDC), inasmuch as PVDC is quite fluid at elevated temperatures such as those present during injection molding.

Now therefore there is disclosed by the present invention that such multilayered containers can be blow molded without deleterious effect to the integrity of the inner layer. The present invention eliminates the erosion tendency of the outer layer on the inner layer as the outer layer is being injection molded on top of the thin fluid inner layer.

It is therefore an object of this invention to provide a method and apparatus for injection blow molding multilayered articles, such as containers.

It is a further object of this invention to provide a method and apparatus for making multi-layered containers, wherein the inner layer parison is injection molded after the outer layer parison.

A still further object of this invention is to provide a method and apparatus for making multi-layered containers as aforesaid, wherein the core rod comprises an injection nozzle for injection molding the inner layer parison.

It is another object of this invention to injection mold thermoplastic material from within a core rod onto the outside of the core to form a parison.

The aforesaid as well as other objects and advantages which will become apparent in a reading of the construction and operation as more fully described hereinafter and claimed, reference being had to the accompanying drawings forming a part hereof, and in which:

Figure 1:
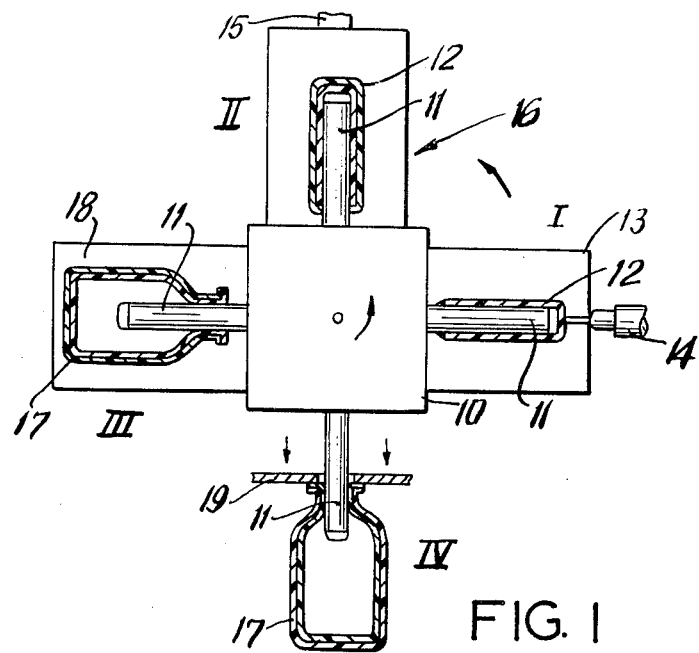
FIG. 1 is a plan view of the overall injection blow molding apparatus taken along the mold split line.

Referring now to FIG. 1 there is shown the overall injection blow molding apparatus comprising an injection molding station I, an internal coating or second injection molding station II, a blow molding station III, and a stripping station IV. A horizontally rotatable, indexing turntable 10 has a series of core rods 11 (typical) mounted thereto and extending outwardly therefrom to be rotatably indexed at the aforesaid stations. The core rod indexing is performed in the well-known customary manner.

At injection molding station I, a thermoplastic parison 12 is injection molded in mold 13 by injector 14 in the customary manner. At the second injection molding station II, a clearance is provided between the parison 12 and core rod 11 and a second thermoplastic is injected by injector 15 therebetween to coat the inside of the first parison; apparatus generally designated as in 16. At station III the internally coated parison is blow molded in mold 18 to form coated container 17 and at station IV, the container 17 is stripped from core rod 11 by stripper 19, and the core rod 11 is then indexed to return to station I to start a new cycle.

The method and apparatus of the present invention principally relates to the construction and operation of apparatus 16 at station II as will be more fully described hereinafter.

Figure 2:
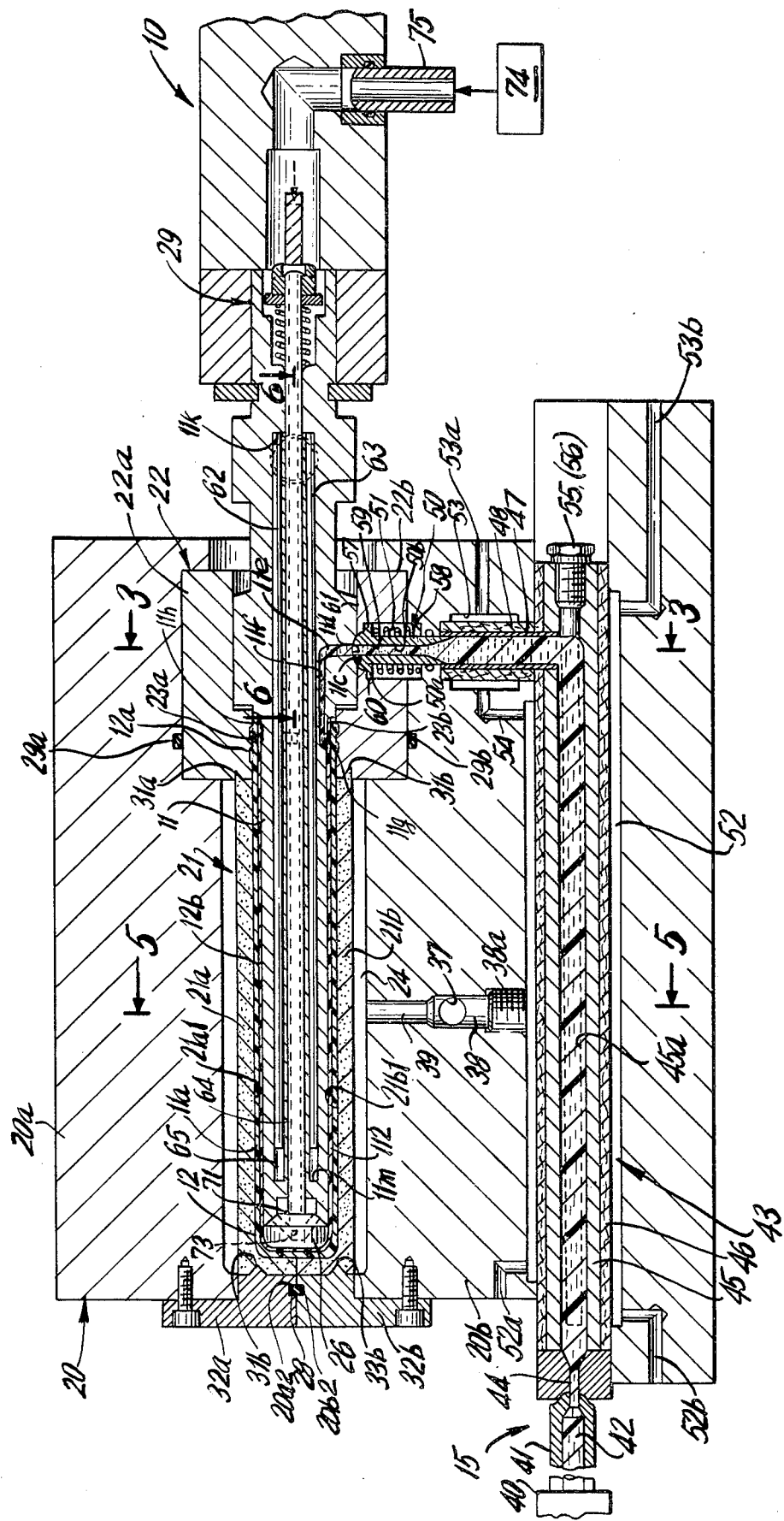
FIG. 2 is a sectional elevational view of the apparatus of this invention.

As shown in FIG. 2 there is a core rod 11 having an injection molded parison 12 thereon and being disposed in a partible mold 20 having a cavity of substantially greater length than diameter; and a sintered metal insert 21 disposed in said mold cavity for purposes hereinafter appearing.

The core rod 11 is of a similar configuration to the core rod and the mechanism 29 for actuating the core rod to provide blow air, as described in U.S. Pat. No. 3,836,305. Core rod 11 comprises a retractably extensible valve head 26 which is depicted in the seated or retracted position in FIG. 2. It was in this position that the parison 12 was injection molded on surface 11a of the core rod. As stated the injection molding of the parison 12 occurs in a previous operation in the conventional manner. The parison to form a container, generally may be said to comprise a neck or finish portion 12a and a body portion 12b. This core rod 11 and injection molded parison 12 thereon are positioned in mold 20.

Mold 20 comprises an upper section 20a and an opposed lower section 20b; section 20a begin movable toward and away from section 20b. This partible mold construction permits the insertion and removal of the core rod and parison. The mold 20 further comprises a neck or finish ring 22 comprising an upper section 22a and a lower section 22b, section 22a being movable with section 20a and section 22b being connected to section 20b. The sections 22a, 22b are formed with cavities 23a, 23b to conform with the specific parison injection molded neck configuration.

Sintered metal insert 21 is of tubular configuration and is formed of an upper insert section 21a and a lower insert section 21b; insert section 21a being mounted and movable with mold section 20a and insert section 21b being mounted in mold section 20b. Initially with mold 20 closed, the respective insert interior surfaces 21a1 and 21b1 form a cavity with a clearance (not shown) between the parison 12 and surfaces 21a1, 21b1 for purposes hereinafter appearing.

The sintered metal insert 21 is of the well known foraminous structure, wherein the pores or foramina are sufficiently small so as to prevent thermoplastic material from entering and clogging the pores, but permit the passage of air or other fluids particularly gases therethrough.

Figure 7:
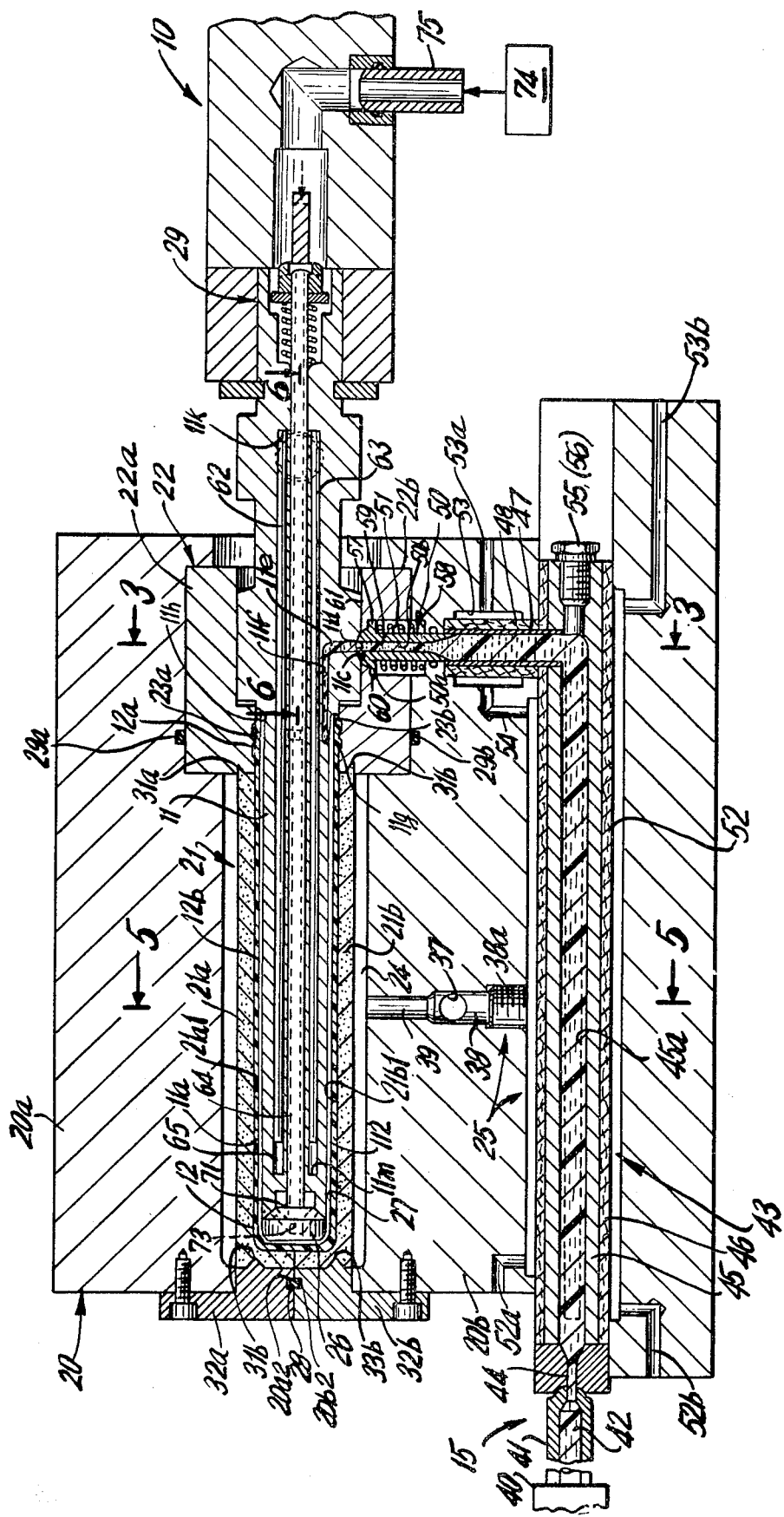
FIG. 7 is a view similar to FIG. 2 but prior to the formation of the inner layer parison.

The foramina of the sintered metal insert communicate with an annular chamber 24 along the length of the mold cavity. A fluid supply means generally designated as 25 is capable of either drawing vacuum or providing air into annular chamber 24, and in turn acting upon and through insert 21 on parison 12. In drawing vacuum through insert 21, the parison 12 is pulled into contact with the inner surfaces 21a1, 21b1, of insert 21 providing an annular clearance 27 (FIG. 7) between the core rod 11 and the inside surface of parison 12. This immediately aforesaid clearance 27 is of substantially the same volume as the previously aforesaid clearance.

Insert section 21a is mounted to neck ring 22a at groove 31a and is mounted to top mold section insert 32a at projection 33a. Similarly, insert section 21b is mounted to neck ring 22b at groove 31b, and is mounted to bottom mold section insert 32b at projection 33b. In this manner of construction insert section 21a is fixedly mounted to mold section 20a and is movable therewith. Insert section 21b is fixedly mounted to mold section 20b.

To insure the fluid integrity of annular chamber 24 an 0-ring 28 is situated in annular grooves 20a2, 20b2 of mold section 20a and 20b respectively. 0-ring 28 extends around the mold cavity and terminates at and into contact with the split neck inserts or neck rings 22a and 22b. With the movement of mold portion 20a toward and away from mold portion 20b, 0-ring 28 remains seated in lower groove 20b2.

A split 0-ring comprising sections 29a and 29b circumferentially encompasses neck ring portions 22a and 22b, respectively, and meet at the mold split line. This further insures the fluid seal aspect of chamber 24 and its effect in acting on parison 12.

Figure 5:
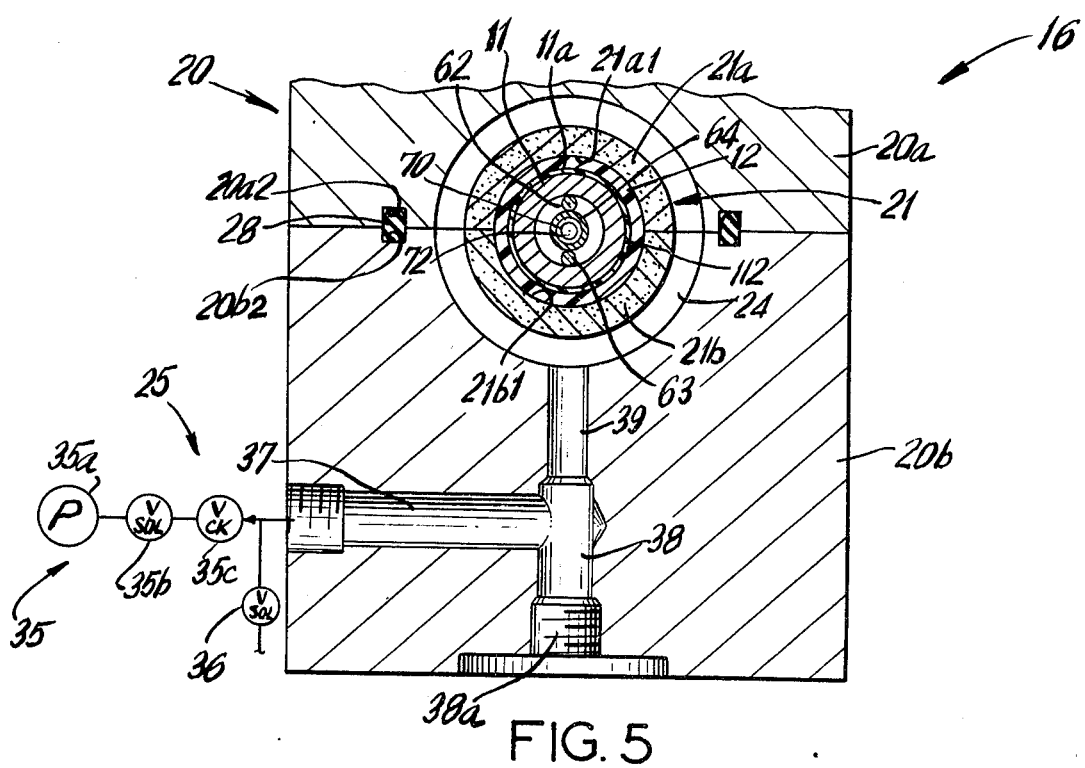
FIG. 5 is a partial sectional view taken along line 5—5 of FIG. 2.

Referring now to FIG. 5, fluid supply system 25, generally comprises a vacuum supply system 35 and an air supply or vacuum break solenoid valve 36, interconnected therewith. Vacuum supply system 35 comprises a vacuum pump 35a, a solenoid valve 35b and a check valve 35c so as to provide the desired vacuum force. Vacuum supply 35 communicates with inlet 37 and vacuum break valve 36 also communicates with inlet 37, in turn communicating with annular chamber 24. A plug 38a seals top hole 38, so that there is communication between inlets 37, 39 and chamber 24. Briefly, annular chamber 24 firstly undergoes vacuum by actuation of vacuum supply 35 and through insert 21, parison 12 is pulled away from core rod 11 to create clearance 27. After said clearance 27 is filled with the internal coating or second parison 112, solenoid valve 36 is actuated to open to break the vacuum and with solenoid valve 35b closed to discontinue the vacuum.

Figure 4:
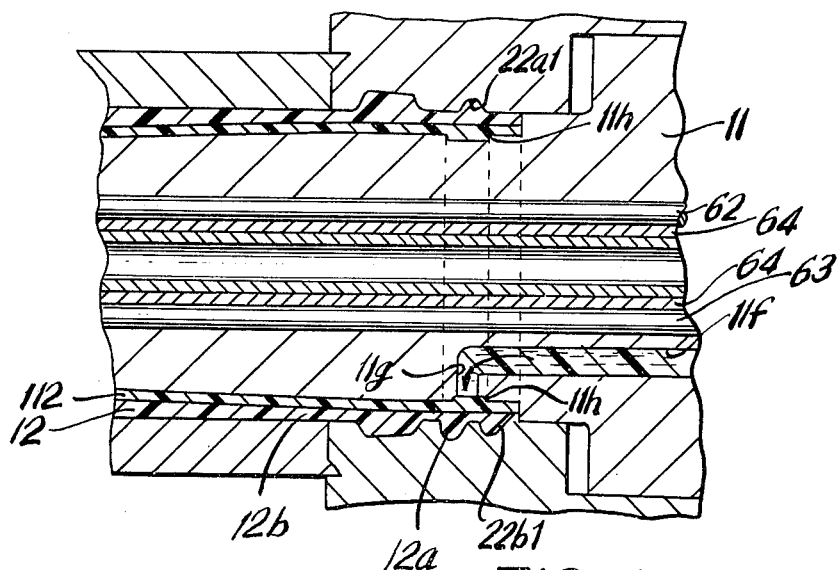
FIG. 4 is an enlarged view of a portion of FIG. 2.

Referring to FIG. 4, in drawing vacuum on parison 12, parison neck portion 12a is drawn tightly into neck ring sections 22a1 and 22b1 thus forming a tight seal therebetween, thereby assuring a vacuum condition while preventing the thermoplastic of parison 112 from flowing to the outside of parison 12.

Figure 3:
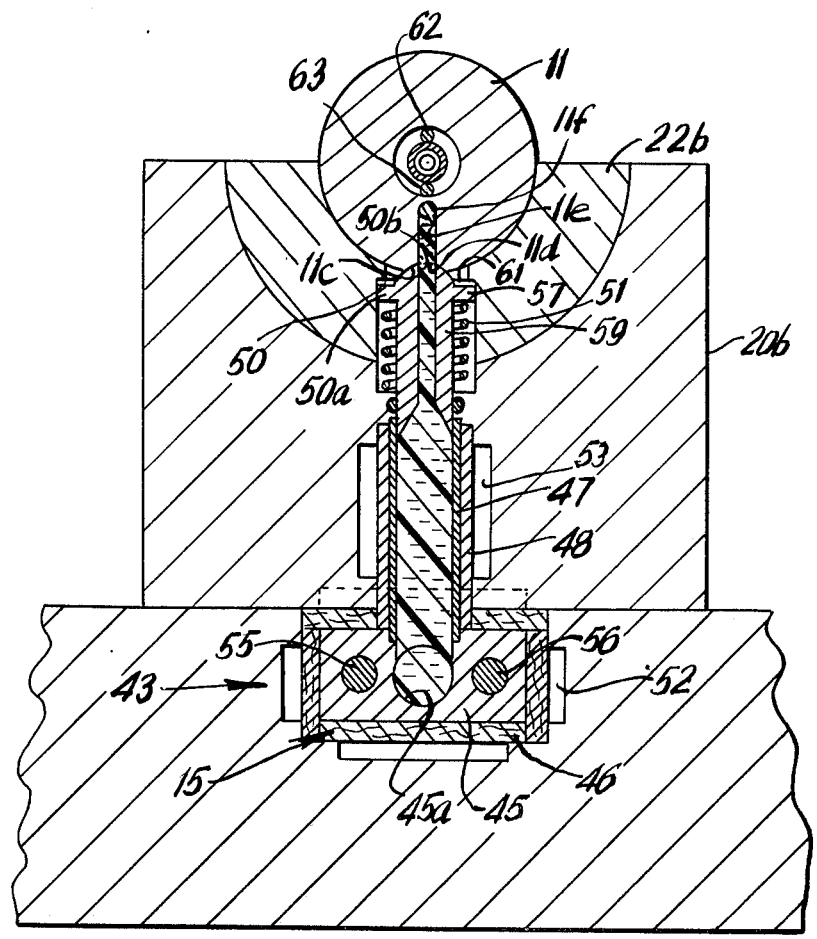
FIG. 3 is a sectional view taken along line 3—3 of FIG. 2.

Referring now to FIGS. 2 and 3, there is shown the thermoplastic injector assembly generally designated as 15. This assembly comprises an extruder injector 40 of similar design and construction to that described in U.S. Pat. No. 3,709,644. Injector 40 operates to render solid thermoplastic into a fluent mass 42 and injects this fluent mass through nozzle 41. The injector 40 as described in U.S. Pat. No. 3,709,644 has the capability of sucking back the fluent thermoplastic mass 42 after injection.

Nozzle 41 communicates with thermoplastic transfer assembly 43 which is mounted below mold section 20b. Transfer assembly 43 comprises an inlet nozzle 44 communicating with nozzle 41; a first transfer tube 45 with insulator 46, tube 45 communicating with a second, right angularly disposed, transfer tube 47 with insulator 48, and an outlet nozzle 50 resiliently mounted by spring 51 and communicating with core rod 11 through neck ring section 22b.

A series of chambers 52 encompass transfer tube 45, and another series of chambers 53 encompass transfer tubes 47; said chambers 52, 53 being interconnected by chamber 54. These chambers serve to further insulate tubes 45 and 47 from mold assembly construction for adequate temperature distribution through tubes 45 and 47 so as to insure fluent flow conditions. Further two electrical cartridge heaters 55 and 56 are mounted within tube 45 on opposite sides of flow channel 45a to maintain the thermoplastic mass at the proper temperature. Additionally a thermocouple probe (not shown) may be housed in tube 45 for automatic control of cartridge heaters 55 and 56. The chambers 52, 53 and 54 communicate with the atmosphere through ports 52a, 52b, 53a, 53b to minimize heat build-up in mold section 20b and larger temperature differentials between the mold section 20b, which will assist in cooling the parisons in the well known manner, and the heated transfer tubes which must keep the thermoplastic material in a flowable state.

Nozzle 50 is formed with shoulder 57 which is opposed to shoulder 58 of flange 50a of mold section 20b, and compression spring 51 is mounted around nozzle body 59 and between shoulders 57 and 58. Further nozzle body 59 slidably engages the inner surface of transfer tube 47. Mold section 20b is also formed with a lip 60 which limits the travel of nozzle 50, particularly flange 50a thereof. In this manner of construction nozzle 50 extends slightly further above surface 61 of mold section 20b than as shown in FIG. 2, prior to indexing of core rod 11. In indexing, core rod 11, specifically recess 11c, engaged nozzle 50 and causes compression of spring 51 to seat nozzle 50 as shown.

This resilient mounting permits the mating of nozzle 50 with the indexing core rod 11. Core rod recess 11c is formed with orifice 11d which mates with the nozzle orifice 50b and communicates with channels 11e and 11f.

Referring now to FIG. 4, channel 11f is shown to communicate with channel 11g which is formed with annular tapered portion 11h which in turn communicates with formed cavity 27 into which the fluent thermoplastic flows. Tapered portion 11h is formed on the periphery of core rod 11 so as to be of annular configuration thereby providing thermoplastic flow around the core rod 11.

It is to be borne in mind that in forming cavity 27 parison neck portion 12a is pulled under vacuum into ring finish surfaces 22a1 and 22b1 and tightly against core rod shoulder 11; so as to provide a fluid tight seal to ensure the proper effect of the vacuum pull on parison body portion 12b.

Figure 6:
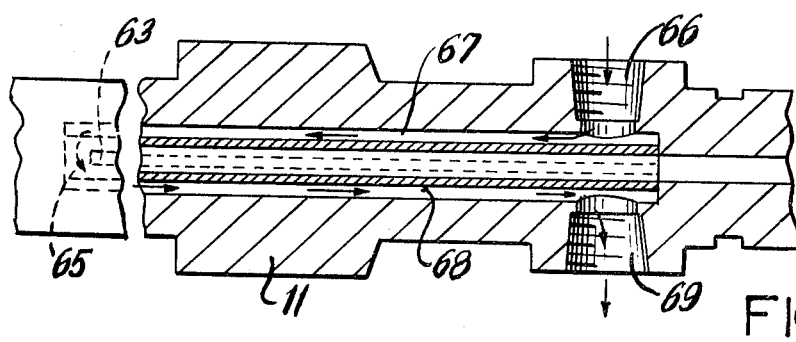
FIG. 6 is a partial sectional view taken along line 6—6 of FIG. 2.

Referring now to FIGS. 2, 4 and 6, to insure proper temperature of the core rod 11, wires 62 and 63 are deformably wedged in the annular space between core rod housing 11 and hollow member 64, and said wires are disposed 180° on opposite sides of member 64. Further at the neck end, wires 62, 63 abut core rod shoulder 11k, and at the free end a channel 65 is formed between the free ends of the wires 62, 63 and the opposed core rod shoulder 11m so as to serve as an interconnecting channel.

By this manner of constructiion, water of the appropriate temperature for either assuring the flowability of the second parison or cooling to its orientation temperature enters inlet 66 and passes through partially annular channel 67, through connecting channel 65, and to partially annular channel 68, and then through outlet 69. Thus there is a rapid two-pass flow effect through the core rod.

It is within the contemplation of this invention that the temperature control fluid, be in addition to water, other coolants including both gases and liquids and mixtures thereof.

A hollow valve stem 70 is mounted to valve head 26 as at 71 so that axial bore 72 of stem 70 communicates with passages 73 (typical) of head 26. Stem 70 is slidable within tubular member 64 with the extension and retraction of valve head 26 by trigger bar mechanism 29. With the valve head extended, blow air is supplied from blow air supply 74 comprising a cylinder or pump (not shown) through nozzle 75, through axial bore 72, and passages 73, to blow the layered parison comprising parisons 12 and 112. It is of course to be understood that mechanism 29 is actuated after formation of the layered parison (12 and 112), and after core rod 11 is removed from mold 20.

In operation, core rod 11 with parison 12 thereon is indexed within mold sections 20a and 20b and specifically between sintered insert sections 21a and 21b forming a cavity (not shown) between the parison 12 and wall portions 21a1 and 21b1. Vacuum is then created by vacuum system 35 to pull parison 12 through the aforesaid cavity so that parison 12 contacts walls 21a1 and 21b1 thereby forming cavity 27. Injector 40 is then actuated to force fluent, heated, insulated thermoplastic material through the transfer system 45 and nozzle 50 into core rod 11 and in turn into cavity 27 thus forming second parison 112. Parison 112 contacts the inner surface of parison 12 so as to form a two-layered parison. Core rod 11 is temperature controlled by means of a temperature control fluid passing through channels 65 and 68 to (1) initially assist in the cooling of parison 12 to permit it to retain its integral form during vacuum pull, (2) subsequently provide heated passages for fluent flow of the thermoplastic therethrough in forming the second parison; (3) and subsequently cooling the second parison for subsequent blow molding at station III.

After injection is complete, injector 40 sucks back the thermoplastic material so that there is a break or separation at portion 11h so as to free the parison 112 and the bulk of the thermoplastic mass is sucked back out of the core rod into nozzle 50 and the transfer tubes 52 and 53.

It is of course understood that while there is above described an operation for forming a two layered parison, the operation could be repeated to form any desired number of layered parisons and resultantly a multi-layered hollow article.

In a preferred embodiment of the invention, the outer wall of the formed article, particularly a container, is formed of any generally well known thermoplastic such as polyethylene, and the like. The inner wall or coating would be preferably thinner than the outer wall and be preferably formed of a generally more costly barrier plastic.

By the term "barrier plastics" it is meant those plastic materials which are resistant to gas permeation and specifically exhibit a resistance or barrier to oxygen permeation. A preferred barrier plastic is Barex 210 (Barex is a registered trademark of Vistron Corporation, Cleveland, Ohio). Barex 210 is an acrylic thermoplastic resin having an oxygen barrier resistance as measured by an oxygen permeation rate of about 0.8 cc-mil/100 sq. in. — 24 hours — atmospheric — at 73° F by the ASTMD 1434-66 test. Barex 210 also exhibits a low water vapor permeation rate of 5.0 gm. mil/100 sq. in. — 24 hours — at 100° F/90 percent relative humidity by the ASTM E 96-63 test.

A most preferred barrier plastic for use as the inner wall or coating, particular so in containers for beverages, is polyvinylidene chloride (PVDC). The apparatus and method of the present invention are particularly suitable to forming a PVDC inner layer because of the fluidity of PVDC at elevated temperatures and the tendency of PVDC to be wiped free of the core rod. In the present invention the PVDC inner parison in its formation does not undergo the wiping forces inherent in certain prior art operations.

It is also within the contemplation of this invention to employ the apparatus for injection molding a parison from within the core rod onto the surface of the core rod in other application in addition to the present invention for forming a multilayered hollow article.

It is also understood that while the preferred embodiment has been described the operation of one core rod at each station clearly a plurality of such core rods could be mounted for operation at each of the stations.

Although specific embodiments of the invention have been described, modifications and changes may be made therein without departing from the scope of the invention as defined in the appended claims.

I claim:

1. An apparatus for making a multi-layered hollow article comprising, a core rod, means operative to form a first parison on said core rod, a mold having a cavity larger than the formed parison and into which said core rod extends with said parison thereon, vacuum means operable to stretch the first parison radially and axially from the core rod so as to provide a cavity between the core rod and the first parison, and means operative to form a second parison in said cavity between the core rod and first parison so as to form a layered parison, the first parison being the outer layer and the second parison being the inner layer, and means operative to blow mold said layered parison to form the hollow article.

2. The apparatus of claim 1, wherein said core rod comprises means to flow thermoplastic material to form the inner layer parison.

3. The apparatus of claim 2, further comprising a thermoplastic injection nozzle communicating with said means in the core rod to flow the thermoplastic material.

4. The apparatus of claim 3, further comprising means to suck back thermoplastic inside the core rod after injection molding the inner layer parison, to sever the inner layer parison from the thermoplastic material in the core rod.

5. The apparatus of claim 1, said vacuum means to form said cavity comprising means to draw a vacuum on the outside surface of said first parison.

6. The apparatus of claim 1, further comprising a foraminous insert disposed between said first parison and said mold, and through which the vacuum is drawn so that said first parison contacts said insert.

7. The apparatus of claim 6, said insert being a sintered metal insert of tubular configuration.

8. The apparatus of claim 1, further comprising means to control the temperature of said core rod.

9. The apparatus of claim 8, said core rod comprising fluid flow circulation means for circulating a temperature control fluid through said core rod.

10. The apparatus of claim 9, said core rod further comprises means to flow thermoplastic material to form said inner layer.

11. The apparatus of claim 10, said core rod further comprising means to blow said layered parison.

12. The apparatus of claim 11, said means to blow said layered parison being axially disposed in said core rod, and said fluid flow circulation means being radially spaced from said blow means.

13. The apparatus of claim 12, said means to blow thermoplastic material being more radially spaced than said fluid flow circulation means from the axis of said core rod.

14. The apparatus of claim 3, wherein said injection nozzle is resiliently mounted with said core rod.

15. An apparatus for making multi-layered hollow articles comprising, a rotatable turntable indexing at a plurality of stations, core rods supportably mounted on said turntable for movement therewith and being opposed to said stations in indexing, a first injection molding station operative for injection molding a first parison on a core rod, a second injection molding station comprising vacuum means operable for stretching the first parison radially and axially of the core rod so as to provide a cavity between the core rod and first parison and means operative for injection molding a second parison on said core rod and into contact with the inside surface of said first parison to form a layered parison, a blow molding station operative to blow mold the layered parison to form a hollow article, and a stripping station operative for removing the hollow article from the core rod.

16. The apparatus of claim 15, further comprising a foraminous insert disposed between said first parison and said mold, and through which the vacuum is drawn so that said first parison contacts said insert.

17. The apparatus of claim 15, wherein said core rod comprises means to flow thermoplastic material to form the inner layer parison.

18. The apparatus of claim 17, further comprising a thermoplastic injection nozzle communicating with said means in the core rod to flow the thermoplastic material, further comprising means to suck back thermoplastic inside the core rod after injection molding the inner layer parison to sever the inner layer parison from the thermoplastic material in the core rod.

19. The apparatus of claim 16, further comprising means to control the temperature of said core rod.

20. An apparatus for making a multi-layered hollow article comprising, a core rod, means operative to form a first parison on said core rod, a mold having a cavity larger than the formed first parison and into which said core rod extends with said parison thereon, means operable to stretch the first parison radially and axially from the core rod, and vacuum means communicating through said mold operative to hold the outside of said first parison into contact with said mold thereby providing a cavity between the core rod and the inside of said first parison, and means operative to form a second parison in said cavity between the core rod and inside of the first parison so as to form a layered parison, the first parison being the outer layer and the second parison being the inner layer, and means operative to blow mold said layered parison to form the hollow article.

* * * * *